US 10,634,433 B2

(12) United States Patent
Andersen et al.

(10) Patent No.: US 10,634,433 B2
(45) Date of Patent: Apr. 28, 2020

(54) DISTILLATION PLANT

(71) Applicant: ALFA LAVAL CORPORATE AB, Lund (SE)

(72) Inventors: Bo Juul Andersen, Snekkersten (DK); Peter Valbjorn, Jyllinge (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 16/064,581

(22) PCT Filed: Dec. 5, 2016

(86) PCT No.: PCT/EP2016/079733
§ 371 (c)(1),
(2) Date: Jun. 21, 2018

(87) PCT Pub. No.: WO2017/108380
PCT Pub. Date: Jun. 29, 2017

(65) Prior Publication Data
US 2018/0372414 A1 Dec. 27, 2018

(30) Foreign Application Priority Data

Dec. 22, 2015 (EP) .................................... 15202068

(51) Int. Cl.
F28D 9/00 (2006.01)
B01D 1/22 (2006.01)
(Continued)

(52) U.S. Cl.
CPC ........... F28D 9/0006 (2013.01); B01D 1/221
(2013.01); B01D 1/26 (2013.01); B01D 3/065
(2013.01);
(Continued)

(58) Field of Classification Search
CPC .......... B01D 1/221; B01D 1/26; B01D 3/065;
B01D 3/105; F28D 9/0006; F28D 9/0043;
(Continued)

(56) References Cited

U.S. PATENT DOCUMENTS 2,855,346 A 10/1958 Williamson
3,150,028 A * 9/1964 Wennerberg ......... A23C 3/0332
159/17.2
(Continued)

FOREIGN PATENT DOCUMENTS

CN 101061070 A 10/2007
CN 102059042 A 5/2011
(Continued)

OTHER PUBLICATIONS

International Search Report (PCT/ISA/210) dated Feb. 1, 2017, by the European Patent Office as the International Searching Authority for International Application No. PCT/EP2016/079733.
(Continued)

Primary Examiner — Youngsul Jeong
Assistant Examiner — Gabriel E Gitman
(74) Attorney, Agent, or Firm — Buchanan Ingersoll & Rooney PC

(57) ABSTRACT

A distillation plant comprises an elongated vessel extending along a longitudinal axis and defining an inner space, and a plurality of plate heat exchangers, which in an operating position are arranged after each other along the longitudinal axis in the vessel. Each plate heat exchanger comprises a plurality of heat exchanger plates, each defining an extension plane. The heat exchanger plates form first plate interspaces and second plate interspaces. The first and second plate interspaces are arranged in an alternating order in the plate heat exchanger. At least one of the plate heat exchangers is associated with a respective opening through the
(Continued)

vessel, and is removable from the operating position out of the vessel through the associated opening by being moved in a displacement direction, which is perpendicular to the extension plane of the heat exchanger plates.

20 Claims, 13 Drawing Sheets

(51) Int. Cl.
 *B01D 1/26* (2006.01)
 *B01D 3/06* (2006.01)
 *B01D 3/10* (2006.01)
(52) U.S. Cl.
 CPC ........... *B01D 3/105* (2013.01); *F28D 9/0043* (2013.01); *F28D 9/0093* (2013.01); *F28F 2280/02* (2013.01); *F28F 2280/06* (2013.01)
(58) Field of Classification Search
 CPC .. F28D 9/0093; F28F 2280/02; F28F 2280/06
 See application file for complete search history.

(56) References Cited

U.S. PATENT DOCUMENTS

| | | | | |
|---|---|---|---|---|
| 3,192,131 | A * | 6/1965 | Loebel | B01D 3/065 138/93 |
| 3,941,663 | A * | 3/1976 | Steinbruchel | B01D 1/26 202/174 |
| 4,145,245 | A * | 3/1979 | Takada | B01D 1/04 159/13.3 |
| 4,636,283 | A | 1/1987 | Nasser | |
| 4,978,429 | A | 12/1990 | Sears et al. | |
| 5,203,406 | A * | 4/1993 | Blomgren | C01D 3/06 159/28.6 |
| 9,285,172 | B2 * | 3/2016 | Taylor | F28D 9/0006 |
| 2005/0150756 | A1 * | 7/2005 | Stout | B01D 3/065 202/174 |
| 2007/0029077 | A1 * | 2/2007 | Mirolli | F28D 9/0006 165/167 |
| 2010/0314083 | A1 * | 12/2010 | Williams | F28B 1/02 165/162 |
| 2011/0247797 | A1 * | 10/2011 | Joensen | F28D 9/005 165/185 |
| 2012/0103578 | A1 * | 5/2012 | Taylor | F28D 9/0006 165/157 |
| 2015/0129181 | A1 | 5/2015 | John et al. | |
| 2015/0360972 | A1 * | 12/2015 | Reuveni | B01D 1/04 202/174 |

FOREIGN PATENT DOCUMENTS

| | | |
|---|---|---|
| CN | 203360034 U | 12/2013 |
| CN | 104556277 A | 4/2015 |
| EP | 2 573 495 B1 | 7/2016 |
| GB | 2 054 819 A | 2/1981 |
| JP | H05-280884 A | 10/1993 |
| JP | 2014-531568 A | 11/2014 |
| KR | 10-2007-0094733 A | 9/2007 |
| WO | WO 2006/054936 A1 | 5/2006 |

OTHER PUBLICATIONS

Written Opinion (PCT/ISA/237) dated Feb. 1, 2017, by the European Patent Office as the International Searching Authority for International Application No. PCT/EP2016/079733.

Office Action (First Office Action) dated Jun. 5, 2019, by the State Intellectual Property Office of the People's Republic of China in corresponding Chinese Patent Application No. 201680075397.8 and an English Translation of the Office Action. (7 pages).

An English Translation of the Search Report dated May 27, 2019, issued by the National Intellectual Property Administration, P. R. China in corresponding Chinese Patent Application No. 201680075397. 8. (3 pages).

An English Translation of the Office Action (Notice of Preliminary Rejection) dated Aug. 21, 2019 by the Korean Patent Office in corresponding Korean Patent Application No. 10-2018-7020708. (4 pages).

\* cited by examiner

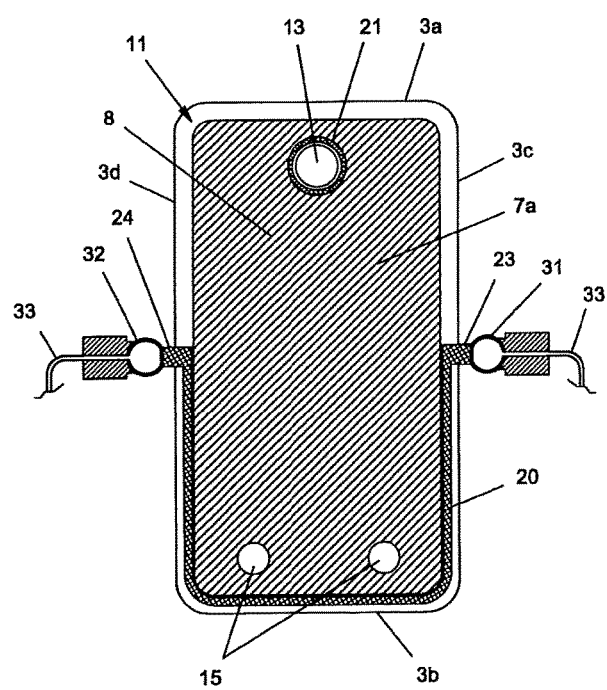
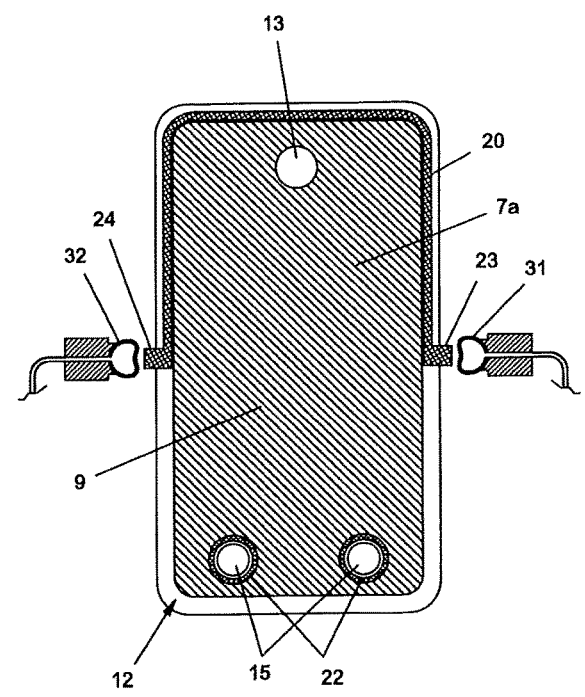
Fig 5                    Fig 6

DISTILLATION PLANT

TECHNICAL FIELD OF THE INVENTION

The present invention refers to a distillation plant comprising
an elongated vessel extending along a longitudinal axis and defining an inner space, and
a plurality of plate heat exchangers, which in an operating position are arranged after each other along the longitudinal axis of the vessel,
wherein each plate heat exchanger comprises a first end plate, a second end plate and a plurality of heat exchanger plates, each defining an extension plane,
wherein the heat exchanger plates are arranged between the first end plate and the second end plate to form first plate interspaces and second plate interspaces, the first and second plate interspaces being arranged in an alternating order in the plate heat exchanger, and
wherein the first end plate and the heat exchanger plates of the plate heat exchangers in the operating position are provided in the inner space.
In particular, the invention refers to a distillation plant for desalination of water.

BACKGROUND OF THE INVENTION AND PRIOR ART

Plate heat exchangers with gaskets between the heat exchanger plates have been used in distillation plants for desalination of sea water for a long time. WO 2006/054936 discloses a distillation plant with such plate heat exchangers. Compared with tube heat exchanger, plate heat exchangers have several advantages. Most important is the compactness. The plate pack is smaller than a corresponding tube bundle. Since the plate pack respectively the tube bundle is placed in a vessel, a reduction of the size will influence the vessel size as well, which means a cost reduction for the vessel. The vessel cost is approximately proportional to the size in power two, so the effect of a size reduction is significant. Consequently the vessels for desalination plants are made as small as possible.

Another advantage with plate heat exchangers with gasketed packs of heat exchanger plates compared to tube bundles is the accessibility to the heat transfer surfaces. By untightening and taking the bolts away the pack can be opened and the heat exchanger plates are accessible. For a normal plate heat exchanger opening can be made in a couple of hours, and the plates can be cleaned and inspected hanging in the frame. It is not necessary to take them out from the frame. For a plate heat exchanger in a compact vessel it is more complicated. Due to the limited space it is not possible to do any service in the vessel, the plates must be taken out from the vessel, one by one, and that takes much longer.

In most big desalination plants there are several effects and each effect has at least one plate heat exchanger. Since all effects are necessary for the desalination process, maintenance of one plate heat exchanger stops the process. In order to reduce the downtime, the plant can have a spare plate heat exchanger, but the time for replacement is still unacceptable.

SUMMARY OF THE INVENTION

The object of the present invention is to overcome the problems discussed above, and to provide a distillation plant in which the downtime for service and maintenance may be further reduced.

This object is achieved by the distillation plant initially defined, which is characterized in that at least one of the plate heat exchangers is associated with a respective opening through the vessel, and that the at least one of the plate heat exchangers is removable from the operating position out of the vessel through the associated opening by being moved in a displacement direction which is perpendicular to the extension plane of the heat exchanger plates.

Thanks to the characterizing features, the plate heat exchangers may be easily removed from the vessel through the respective associated opening to permit service and maintenance of the plate heat exchangers outside the vessel. All work for opening the plate heat exchanger, and inspect and clean the individual heat exchanger plates may thus be performed outside the vessel. When a plate heat exchanger is removed for service, a replacement plate heat exchanger may be ready to be moved into the vessel in order to minimize downtime.

By orienting the plate heat exchanger so that the plates extend in parallel with the longitudinal axis, the port channels through the plate heat exchangers will extend in parallel with the displacement direction, which enables an easy connection and an easy disconnection of the plate heat exchanger to liquid feed and condensate discharge conduits when the plate heat exchanger is to be mounted in or removed from the vessel.

By arranging the plate heat exchangers after each other along the longitudinal axis of the vessel, in particular in one single row, the dimensions, especially the diameter, of the vessel may be relatively small.

According to an embodiment of the invention, the displacement direction is perpendicular to the longitudinal axis for the at least one of the plate heat exchangers.

According to a further embodiment of the invention, the at least one of the plate heat exchangers is supported by a respective guide member, which permits the plate heat exchanger to be moved in the displacement direction.

According to a further embodiment of the invention, the guide member comprises a suspension rail in which the plate heat exchanger is movably suspended.

According to a further embodiment of the invention, the suspension rail extends in parallel with the displacement direction, and preferably perpendicularly to the longitudinal axis for the at least one of the plate heat exchangers.

According to a further embodiment of the invention, the guide member comprises two guide rails on which the plate heat exchanger is movably provided.

According to a further embodiment of the invention, the guide rails extend in parallel with the displacement direction, and preferably perpendicularly to the longitudinal axis for the at least one of the plate heat exchangers.

According to a further embodiment of the invention, the second end plate of the at least one of the plate heat exchangers forms a cover sealingly closing the associated opening through the vessel. The plate heat exchanger may thus be introduced into the vessel by being moved along the displacement direction and the guide member, the suspension rail or the guide rails, to the operating position at which the first end plate and the heat exchanger plates are located in the inner space, and the second end plate abuts an outer surface of the vessel and forms a cover sealingly closing the associated opening.

According to a further embodiment of the invention, a gasket is provided between the vessel and the second end plate.

According to another embodiment of the invention, the second end plate of the at least one of the plate heat exchangers is provided inside the associated opening, wherein a separate cover is provided outside the second end plate and is sealingly closing the associated opening through the vessel According to a further embodiment of the invention, a gasket is provided between the vessel and the separate cover.

According to a further embodiment of the invention, the plurality of plate heat exchangers comprises at least one primary plate heat exchanger in which the first plate interspaces are configured for condensation and the second plate interspaces are configured for evaporation, and wherein the at least one primary plate heat exchanger has a steam inlet, which extends perpendicularly to the extension plane of the heat exchanger plates and communicates with the first plate interspaces, and a steam outlet, which extends perpendicularly to the extension plane of the heat exchanger plates and communicates with the second plate interspaces.

According to a further embodiment of the invention, the steam inlet extends through an upper side of the primary plate heat exchanger and an upper part of two opposite lateral sides of the primary plate heat exchanger.

According to a further embodiment of the invention, the steam outlet extends through a lower side of the primary plate heat exchanger and a lower part of two opposite lateral sides of the primary plate heat exchanger.

According to a further embodiment of the invention, the distillation plant comprises a sealing arrangement separating the steam inlet from the steam outlet of the at least one primary plate heat exchanger in the operating position in the inner space.

According to a further embodiment of the invention, the at least one primary plate heat exchanger comprises first transition area extending perpendicularly to the extension plane of the heat exchanger plates between the steam inlet and the steam outlet, and a second transition area extending perpendicularly to the extension plane of the heat exchanger plates between the steam inlet and the steam outlet, and wherein the sealing arrangement comprises a first sealing member engaging the first transition area and a second sealing member engaging the second transition area.

According to a further embodiment of the invention, the first transition area extends on a first lateral side of the primary plate heat exchanger, and the second transition area extends on a second lateral side of the primary plate heat exchanger.

According to a further embodiment of the invention, each of the first and second sealing members is inflatable from a rest position at a distance from the first transition area and the second transition area, respectively, to a sealing position at which each of the first and second sealing members engages the first transition area and the second transition area, respectively.

A sub-pressure, i.e. a pressure below the atmospheric pressure, may prevail in the inner space. The first and second sealing members may thus be inflated by being connected to the surrounding atmosphere.

According to a further embodiment of the invention, the at least one primary plate heat exchanger comprises a respective gasket in each of the first plate interspaces and the second plate interspaces, and wherein each gasket extends to the first transition area and to the second transition area.

According to a further embodiment of the invention, the gaskets are made of a rubber material, which forms the first transition area and the second transition area.

According to a further embodiment of the invention, the at least one primary plate heat exchanger has a liquid inlet port channel communicating with the second plate interspaces and connected to a liquid feed conduit for the supply of a liquid to be evaporated in the second plate interspaces, and a liquid outlet port channel communicating with the first plate interspaces and connected to a condensate discharge conduit for the discharge of a condensate from the first plate interspaces.

According to a further embodiment of the invention, the liquid inlet port channel and the liquid outlet port channel extend through the second end plate.

According to a further embodiment of the invention, the liquid inlet feed conduit and the condensate discharge conduit extend outside the inner space.

According to a further embodiment of the invention, the liquid inlet port channel is connected to the liquid feed conduit by means of an inlet connection member.

According to a further embodiment of the invention, the liquid outlet port channel is connected to the condensate discharge conduit by means of an outlet connection member.

According to a further embodiment of the invention, the liquid inlet port channel and the liquid outlet port channel both extend through the first end plate.

According to a further embodiment of the invention, the inlet connection member permits connection to the liquid feed conduit by being moved along the displacement direction.

According to a further embodiment of the invention, the outlet connection member permits connection to the condensate discharge conduit by being moved along the displacement direction.

According to a further embodiment of the invention, the distillation plant comprises a plurality of effects, each effect comprising at least one primary plate heat exchanger, and wherein each effect comprises a liquid separator provided in the inner space downstream the second plate interspaces.

According to a further embodiment of the invention, each effect may comprise two primary plate heat exchangers, three primary plate heat exchangers, four primary plate heat exchangers, or even more primary plate heat exchangers. It is also possible to provide different numbers of primary plate heat exchangers in the different effects. For instance, the number of primary plate heat exchangers in each effect may increase along the longitudinal axis such that a first effect may comprise one primary plate heat exchanger, a second effect two primary plate heat exchangers, and a third effect three primary plate heat exchangers.

According to a further embodiment of the invention, the distillation plant comprises one effect, two effects, three effects, four effects, five effects or even more, in the vessel. It may also be noted that several vessels may be provided each comprising a plurality of effects.

According to a further embodiment of the invention, the inner space defines a plurality of subspaces, one for each effect, wherein each subspace defines a first part space communicating with the first plate interspaces and a second part space communicating with the second plate interspaces, and wherein a second part space of one effect communicates with a first part space of a subsequent effect.

According to a further embodiment of the invention, the extension plane of the heat exchanger plates of at least one of the plurality of plate heat exchangers extends in parallel with the longitudinal axis of the vessel.

According to a further embodiment of the invention, the extension plane of the plurality of plate heat exchangers extends in parallel with the longitudinal axis of the vessel.

According to a further embodiment of the invention, the extension plane of a first one of the plurality of plate heat exchangers extends perpendicularly to the longitudinal axis of the vessel.

According to a further embodiment of the invention, the extension plane of a last one of the plurality of plate heat exchangers extends perpendicularly to the longitudinal axis of the vessel.

According to a further embodiment of the invention, a last one of the plurality of plate heat exchangers forms a condenser of the distillation plant.

BRIEF DESCRIPTION OF THE DRAWINGS

The invention is now to be explained more closely through a description of various embodiments and with reference to the drawings attached hereto.

FIG. 5 discloses a plan view of a heat exchanger plate of the plate heat exchanger along the line V-V in FIG. 4.

FIG. 6 discloses a plan view of another heat exchanger plate of the plate heat exchanger along the line VI-VI in FIG. 4.

DETAILED DESCRIPTION OF THE DRAWINGS

FIGS. 1 to 8 illustrate a first embodiment of a distillation plant comprising an elongated vessel 1 extending along a longitudinal axis x. The vessel 1 defines an inner space 2, in which a sub-pressure, i.e. a pressure below the atmospheric pressure, may prevail. A plurality of plate heat exchangers 3, 4 are arranged in an operating position after each other along the longitudinal axis x in the inner space 2 of the vessel 1.

Figure 1:
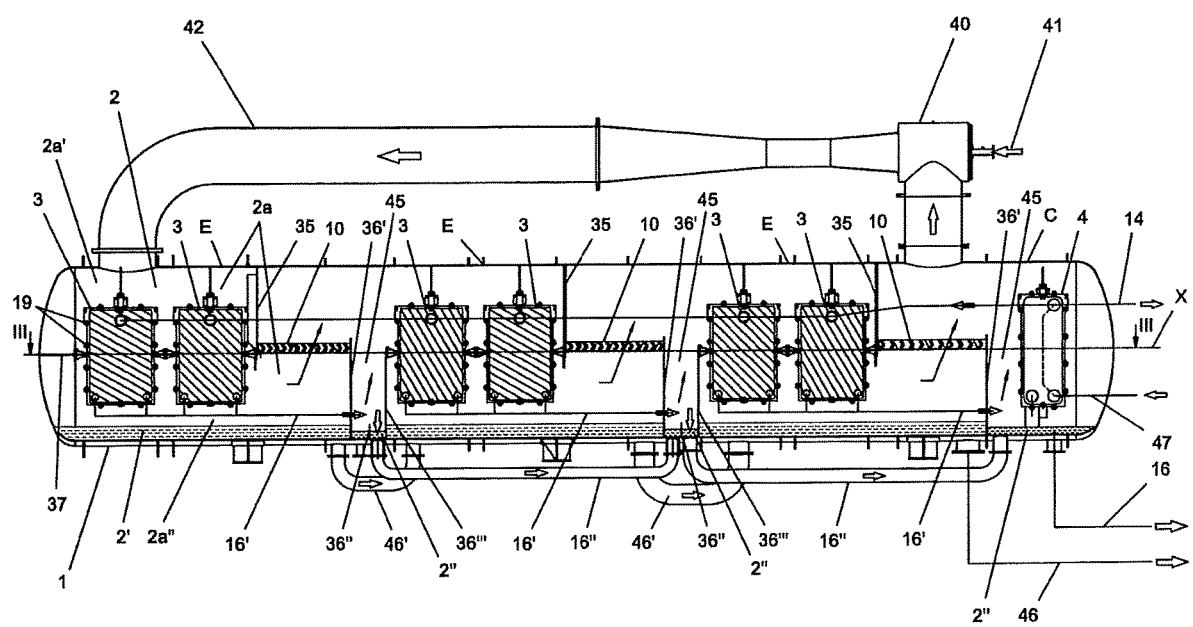
FIG. 1 discloses a schematic longitudinal sectional side view along the line I-I in FIG. 7 through a vessel of a distillation plant according to a first embodiment of the invention.
Figure 3:
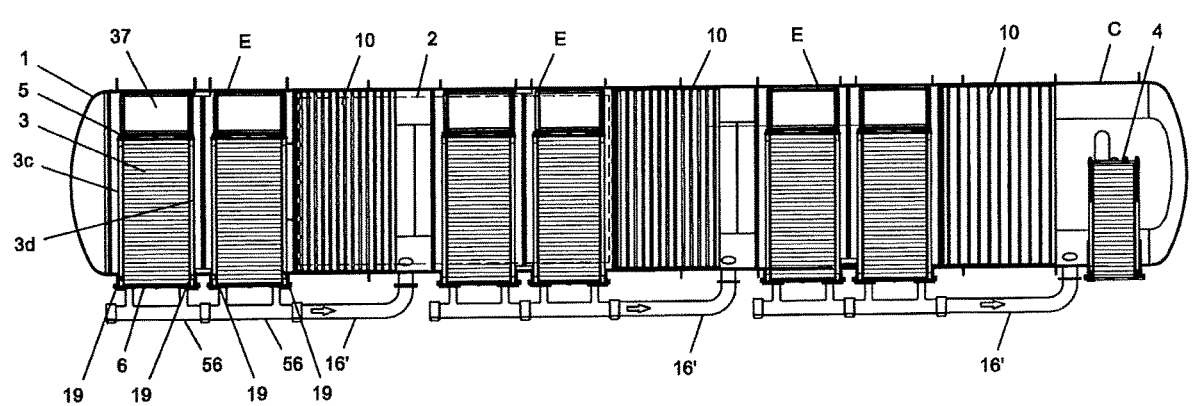
FIG. 3 discloses a schematic longitudinal sectional view along the line III-III in FIG. 1.

At least one of the plate heat exchangers 3, 4 is a primary plate heat exchanger 3, and at least one a condenser 4. In FIGS. 1 and 3, there are six primary plate heat exchangers 3 and one condenser 4. Preferably, all of the primary plate heat exchangers 3 of the distillation plant are identical.

Figure 4:
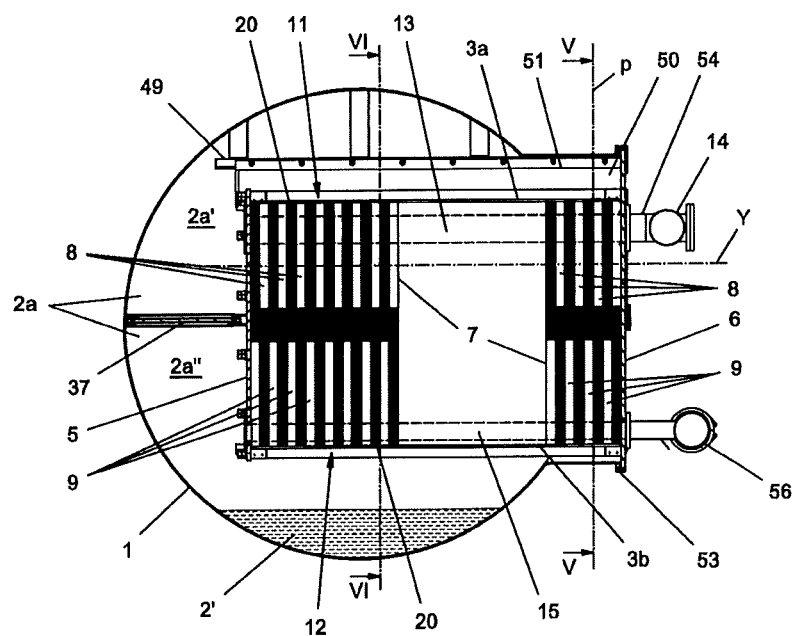
FIG. 4 discloses a side view of a plate heat exchanger in the vessel of the distillation plant in FIG. 1.

Each plate heat exchanger 3, 4 comprises a first end plate 5, a second end plate 6 and a plurality of heat exchanger plates 7, see FIG. 4. Each plate 5, 6 and 7 defines an extension plane p. In the first embodiment, the extension plane p of the heat exchanger plates 7 of all of the plate heat exchangers 3 extends in parallel with the longitudinal axis x of the vessel 1.

The heat exchanger plates 7 are arranged between the first end plate 5 and the second end plate 6 to form first plate interspaces 8 and second plate interspaces 9, see also FIGS. 5 and 6. The first and second plate interspaces 8 and 9 are arranged in an alternating order in the plate heat exchanger 3. Each heat exchanger plate 7 defines a heat exchanger surface 7a, which may be corrugated in a known manner.

Each plate heat exchanger 3 comprises a number of tie bolts 19 extending through the first end plate 5 and the second end plate 6 for tightening the heat exchanger plates 7 against each other, see FIGS. 1 and 3.

In the primary plate heat exchangers 3, the first plate interspaces 8 are configured for condensation of steam and second plate interspaces 9 are configured for evaporation of liquid.

The distillation plant comprises a plurality of effects E, wherein each effect E comprises at least one primary plate heat exchanger 3. In FIG. 1, the distillation plant comprises three effects E, wherein each effect E comprises two primary plate heat exchangers 3.

Each effect E comprises a liquid separator 10, which is provided in the inner space 2 downstream the primary plate heat exchangers 3 and the second plate interspaces 9 of the respective effect E.

The fourth plate heat exchanger 4 to the right in FIG. 1 is a condenser comprised by a condenser effect C.

As can be seen in FIG. 1, the inner space 2 defines or comprises a plurality of subspaces 2a. Each effect E is defined by or provided in a respective subspaces 2a. Each subspace 2a defines a first part space 2a' communicating with the first plate interspaces 8 and a second part space 2a" communicating with the second plate interspaces 9. As can be seen in FIG. 1, a second part space 2a" of one effect E communicates with a first part space 2a' of a subsequent effect E via the liquid separator 10.

Each of the primary plate heat exchangers 3 has a steam inlet 11 and a steam outlet 12, see FIGS. 4-6.

The steam inlet 11 extends perpendicularly to the extension plane p of the heat exchanger plates 7 and communicates with the first plate interspaces 8. More precisely, the steam inlet 11 extends through an upper side 3a of the primary plate heat exchanger 3 and an upper part of two opposite lateral sides 3c, 3d of the primary plate heat exchanger 3, see FIGS. 3-5.

The steam outlet 12 extends perpendicularly to the extension plane p of the heat exchanger plates 7 and communicates with the second plate interspaces 9. More precisely, the steam outlet 12 extends through a lower side 3b of the primary plate heat exchanger 3 and a lower part of two opposite lateral sides 3c, 3d of the primary plate heat exchanger 3, see FIGS. 3, 4 and 6.

Each of the primary plate heat exchangers 3 has a liquid inlet port channel 13 communicating with the second plate interspaces 9 and connected to a liquid feed conduit 14 for the supply of a liquid to be evaporated in the second plate interspaces 9, see FIG. 4. The number of liquid inlet port channels 13 may be another than one, for instance two, three, etc.

Each of the primary plate heat exchangers 3 also has two liquid outlet port channels 15 communicating with the first plate interspaces 8 and connected to a condensate discharge conduit 16' for the discharge of a condensate from the first plate interspaces 8, see FIG. 4. The number of liquid outlet port channels 15 may be another than two, for instance one, three, etc.

Each of the primary plate heat exchangers 3 comprises a respective gasket 20 in each of the first plate interspaces 8 and the second plate interspaces 9. The gasket 20 extends around a lower part of the heat exchanger surface 7a in the first plate interspace 8, see FIG. 5. The gasket 20 extends around an upper part of the heat exchanger surface 7a in the second plate interspace 9, see FIG. 6.

In the first plate interspace 8, a gasket 21 is provided around the liquid inlet port channel 13. In the second plate interspace 9, a respective gasket 22 is provided around the liquid outlet port channels 15.

The distillation plant comprises a sealing arrangement separating the steam inlet 11 from the steam outlet 12 of the primary plate heat exchangers 3 in the operating position in the inner space 2.

Each of the primary plate heat exchangers 3 comprises first transition area 23 and a second transition area 24. The first transition area 23 and the second transition area 24 are comprised by the sealing arrangement.

As can be seen in FIGS. 5 and 6, each gasket 20 extends to the first transition area 23 and to the second transition area 24. In particular, the first transition area 23 and the second transition area 24 are formed by the material of the gaskets 20. The material of the gaskets 20, the first transition area 23 and the second transition area 24 may be a rubber material.

The first transition area 23 extends perpendicularly to the extension plane p of the heat exchanger plates 7 between the steam inlet 11 and the steam outlet 12. The first transition area 23 extends on a first of the lateral sides 3c of the primary plate heat exchanger 3.

The second transition area 24 extends perpendicularly to the extension plane p of the heat exchanger plates 7 between the steam inlet 11 and the steam outlet 12. The second transition area 24 extends on a second of the lateral sides 3d of the primary plate heat exchanger 3.

The sealing arrangement comprises a first sealing member 31 engaging the first transition area 23 and a second sealing member 32 engaging the second transition area 24 for each primary plate heat exchanger 3, see FIGS. 5 and 6. The first and second sealing members 31, 32 are inflatable. Since a sub-pressure prevails in the inner space 2, the first and second sealing members 31, 32 may be inflated by being connected to the surrounding atmosphere outside the vessel 1, via a respective conduit 33.

The first sealing member 31 is inflatable from a rest position, see FIG. 6, at a distance from the first transition area 23 to a sealing position, see FIG. 5, at which the first sealing member 31 engages the first transition area 23.

The second sealing member 32 is inflatable from a rest position, see FIG. 6, at a distance from the second transition area 24 to a sealing position, see FIG. 5, at which the second sealing member 32 engages the second transition area 24.

As can be seen in FIGS. 1 and 3, the subspaces 2a are separated from each other by an upper wall 35 and a lower wall 36'. The liquid separator 10 is provided between the upper wall 35 and the lower wall 36'. The vessel 1 also comprises a divider member 37, which may extend in parallel with longitudinal axis x. The divider member 37 carries the first and second sealing members 31, 32 and the liquid separator 10.

The first part space 2a' of the first effect E, to the left in FIG. 1, is thus delimited, by the vessel 1, one of the upper walls 35 and the divider member 37.

The second part space 2a" of the first effect E is delimited by the vessel 1, one of the lower walls 36' and the divider member 37 including the liquid separator 10.

The first part space 2a' of the second effect E is delimited by the vessel 1, two of the upper walls 35 and the divider member 37 including the liquid separator 10.

The second part space 2a" of the second effect E is delimited by the vessel 1, the two lower walls 36' and 36'", and the divider member 37 including the liquid separator 10.

The first part space 2a' of the third effect E is delimited by the vessel 1, two of the upper walls 35 and the divider member 37 including the liquid separator 10.

The second part space 2a" of the third effect E is delimited by the vessel 1, the two lower walls 36' and 36'", and the divider member 37 including the liquid separator 10.

The first part space 2a' of the condenser effect C is delimited by the vessel 1, one of the upper walls 35, one of the lower walls 36', and the liquid separator 10.

The distillation plant also comprises a compressor 40 which is configured to be operated through the supply of external steam at a high pressure via a supply conduit 41, see FIG. 1. The compressor 40 feeds steam to the first effect E via steam feed conduit 42. The steam fed to the first effect E has a pressure and a temperature, which is higher than the pressure and the temperature of the surrounding atmosphere.

The steam is fed to the first plate interspaces 8 of the primary plate heat exchangers 3 of the first effect E via the steam inlet 11. Liquid is at the same time fed to the second plate interspaces 9 via the liquid feed conduit 14, see FIG. 7, and the liquid inlet port channel 13 of the primary plate heat exchangers 3 of each of the effects E.

In the first effect E, the steam is condensed in the first plate interspaces 8 and the liquid is vaporized in the second plate interspaces 9. The condensate from the first plate interspaces 8 is discharged via the liquid outlet port channels 15 of the primary plate heat exchangers 3 of the effects E and the condensate discharge conduit 16'.

The steam generated in the second plate interspaces 9 of the primary plate heat exchangers 3 of the first effect E exits the second plate interspaces 9 via the steam outlet 12 and enters the second part space 2a" of the first effect E. The steam is then conveyed through the liquid separator 10 into the first part space 2a' of the second effect E, and from there via the steam inlet 11 into the first plate interspaces 8 of the primary plate heat exchanger 3 of the second effect E.

Condensate is thus generated in the first plate interspaces 8 and steam in the second plate interspaces 9 of the primary plate heat exchangers 3 of the second effect E.

The process is then repeated in the primary plate heat exchangers 3 of the third effect E. The pressure and the temperature decreases successively from the first effect E to the third effect E, i.e. the last effect E.

A part of the steam generated in the primary plate heat exchangers 3 of the third effect E is fed to the first plate interspaces 8 of the plate heat exchanger 4 of the condenser effect C. The remaining part of the steam generated in the primary plate heat exchangers of the third effect E is conveyed to the compressor 40 to be mixed with the external steam, wherein the mixture is fed to the primary plate heat exchangers 3 of the first effect E.

Liquid is fed to the second plate interspaces 9 of the plate heat exchanger 4 of the condenser effect C via an inlet conduit 47. The liquid cools the steam fed to the plate heat exchanger 4 of the condenser effect C so that it is condensed and then discharged to a final condensate discharge conduit 16. A part of the liquid is preheated in the plate heat exchanger 4 and then fed to a liquid inlet port channels 13 via the liquid feed conduit 14. Another part of the liquid is discharged via an outlet conduit (to the right in FIG. 1).

All of the liquid fed to the second plate interspaces 9 of the primary plate heat exchangers 3 of the effects E is not evaporated. This excess liquid forms a brine, which together with liquid caught in the liquid separators 10 are collected in a lower brine space 2' of each second part space 2a", as can be seen in FIGS. 1 and 4.

A flash chamber 45 is provided downstream each effect E in the vessel 1.

The condensate from the preceding effect E is conveyed to the flash chamber 45 of the following effect E, C via the condensate discharge conduit 16'. Due to the lower pressure in the flash chamber 45 of the following effect E, C, a part of the condensate will evaporate, and may then be added to the steam to the be fed to the first plate interspaces 8 of the primary plate heat exchangers 3 and condenser 4, respectively of the following effect E, C.

The flash chamber 45 is delimited by the lower walls 36' and 36''', and an additional wall 36". The lower wall 36' and the additional wall 36" separate a lower condensate space 2" from the lower brine space 2' so that the brine cannot mix with the condensate.

The brine from the lower brine space 2' of the first effect E is conveyed to the lower brine space 2' of the following effect E via a brine conduit 46'. The brine from the lower brine space 2' of the second effect E is conveyed to the lower brine space 2' of the following third effect E via a brine conduit 46'. The brine from the third effect E, to the right in FIG. 1, is discharged from the vessel 1 via a final brine conduit 46. In the first embodiment, the brine conduits 46' are located outside the vessel 1.

The condensate of the lower condensate space 2" of the flash chamber 45 preceding the second effect E is conveyed to the lower condensate space 2" of the following effect E via a condensate conduit 16". The condensate of the lower condensate space 2" of the flash camber 45 preceding the third effect E is conveyed to a lower condensate space 2" of the condenser effect C via a condensate conduit 16". The condensate from the lower condensate space 2' of the condenser effect C is discharged from the vessel 1 via the final condensate discharge conduit 16. In the first embodiment, the condensate conduits 16" are located outside the vessel 1, see also FIG. 7.

Each of the plate heat exchangers 3, 4 is associated with a respective opening 50 through the vessel 1, see FIG. 4. The opening 50 is rectangular. As can be seen in FIG. 4, the first end plate 5 and the heat exchanger plates 7 of the plate heat exchanger 3, 4 are provided in the inner space 2, when the plate heat exchanger 3, 4 is in the operating position.

The extension plane p of the heat exchanger plates 7 of the plate heat exchangers 3, 4 extends in parallel with the longitudinal axis x of the vessel 1. Each of the plate heat exchangers 3, 4 is removable from the operating position out of the vessel 1 through the associated opening 50 by being moved in a displacement direction y. The displacement direction y is perpendicular to the extension plane p of the heat exchanger plates 7.

Each of the plate heat exchangers 3, 4 is supported by a guide member, which permits the plate heat exchanger 3, 4 to be moved in the displacement direction y.

According to the first embodiment, the guide member comprises a suspension rail 49 which is stationary and mounted in the vessel 1. Each primary plate heat exchanger 3, and preferably also the condenser 4, comprises a mounting beam 51, in which the first end plate 5, the heat exchanger plates 7 and the second end plate 6 are mounted. A T-shaped part of the mounting beam 51 engages a T-shaped recess in each of the plates 5, 6, 7, see FIG. 2.

Figure 2:
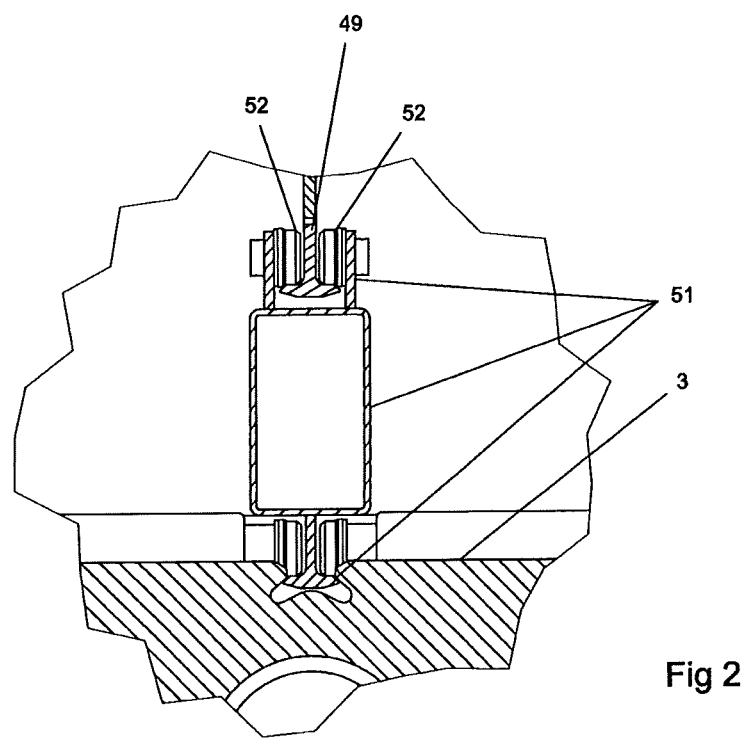
FIG. 2 discloses a longitudinal sectional detail view of a guide member of the distillation plant in FIG. 1.

The mounting beam 51 of the plate heat exchanger 3, 4 is movably suspended, see FIGS. 2-4, in the suspension rail 49. Rollers or wheels 52 may be provided between the suspension rail 51 and the mounting beam 51 of the plate heat exchanger 3, 4 to facilitate the moving of the plate heat exchanger 3, 4 along the suspension rail 51, see FIG. 2.

In the first embodiment, the second end plate 6 is provided outside the inner space 2. The second end plate 6 of the plate heat exchanger 3, 4 is bigger than the associated opening 50 and forms a cover sealingly closing the associated opening 50 through the vessel 1. A gasket 53 is provided between the vessel 1 and the second end plate 6.

The plate heat exchanger 3, 4 may thus be introduced into the vessel 1 by being moved along the displacement direction y and the suspension rail 51 to the operating position at which the first end plate 5 and the heat exchanger plates 7 are located in the inner space 2. During the introduction, the first and second sealing members 31 and 32 are in the rest position.

When the plate heat exchanger 3, 4 has reached the operating position, the first and second sealing members 31, 32 are inflated to the sealing position, see FIG. 5. Furthermore, the second end plate 6 seals, by means of the gasket 53, against an outer surface of the vessel 1 and forms a cover sealingly closing the associated opening 50.

When the plate heat exchanger 3, 4 is to be removed, the first and second sealing members 31, 32 are deflated and thus brought to the rest position, whereafter the plate heat exchanger 3, 4 may be moved along the displacement direction y.

In the first embodiment, the liquid inlet port channel 13 and the liquid outlet port channels 15 extend through the second end plate 6. The liquid inlet port channel 13 is connected to the liquid feed conduit 14 by means of an inlet connection 54. The liquid outlet port channels 15 are connected to the final condensate discharge conduit 16 by means of an outlet connection member 56. The inlet connection member 54 and the outlet connection member 56 are located outside the vessel 1 as can be seen in FIG. 4.

Figure 7:
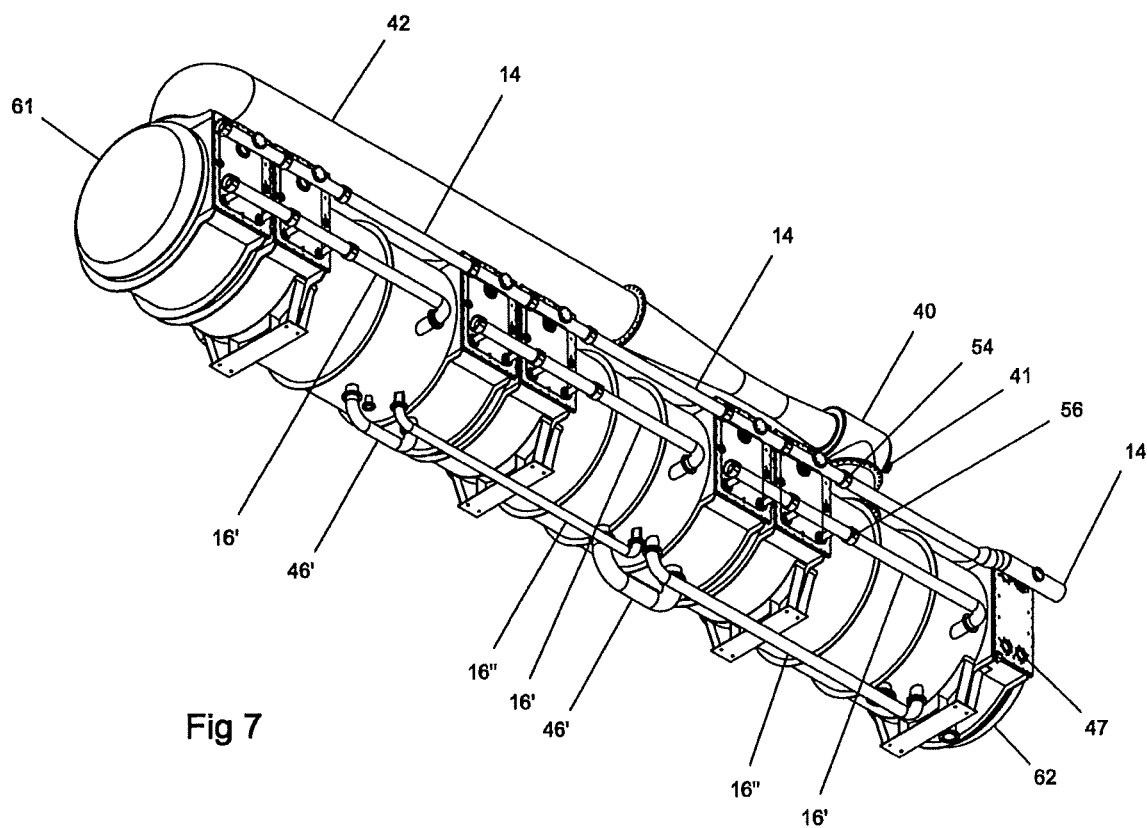
FIG. 7 discloses a perspective view of the distillation plant in FIG. 1.

The outlet connection member 56 connects to the two outlet ports channels 15 by means of a respective branch portion each extending from a main portion which connects to, and may be aligned with, the condensate discharge conduit 16' as can be seen in FIGS. 3 and 7.

As can be seen in FIG. 7, the vessel 1 of the distillation plant of the first embodiment 1 has a circular cylindrical shape. The vessel 1 has two opposite end sides 61, 62 which have convex shape.

Figure 9:
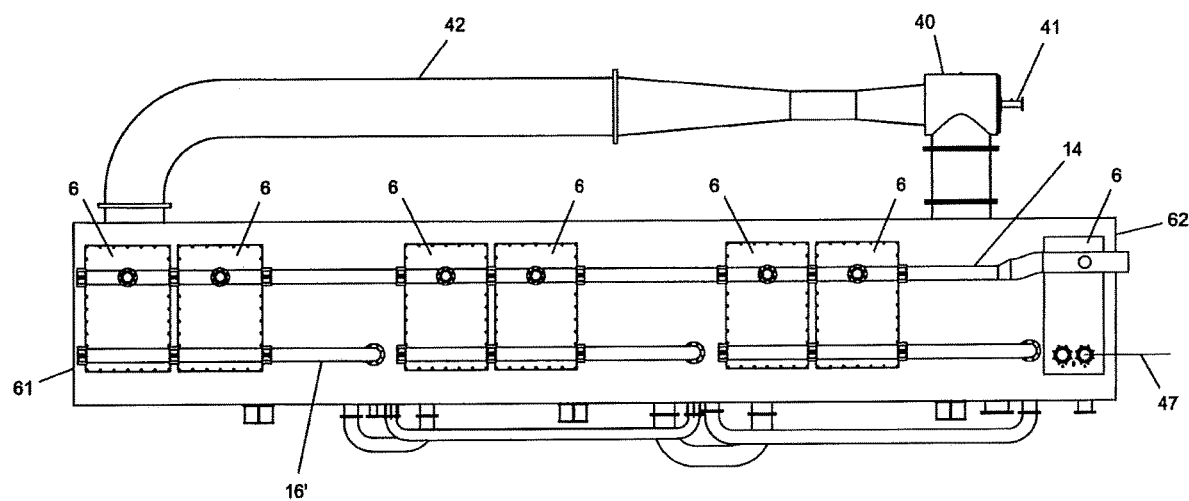
FIG. 9 discloses a side view of a distillation plant according to a second embodiment of the invention.
Figure 10:
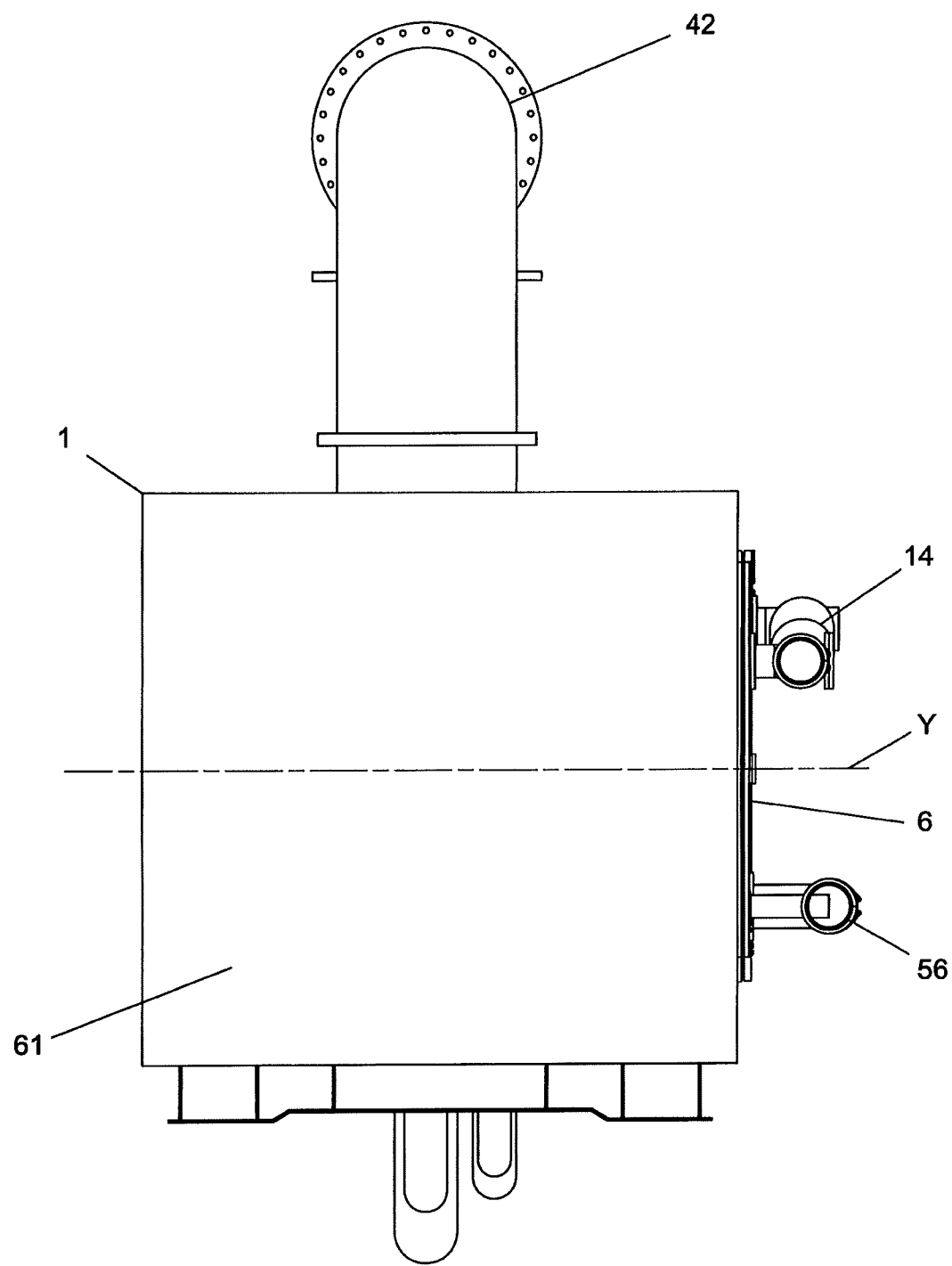
FIG. 10 discloses an end view of the distillation plant in FIG. 9.

FIGS. 9 and 10 illustrates a second embodiment which differs from the first embodiment only in that the vessel 1 has box-like shape with straight plane sides. It may be noted that the upper side, and possibly the lower side, may have a concave depression (not shown) at each respective effect E. Such a concave depression makes it possible to reduce the thickness of the sheet material forming the vessel 1.

Figure 11:
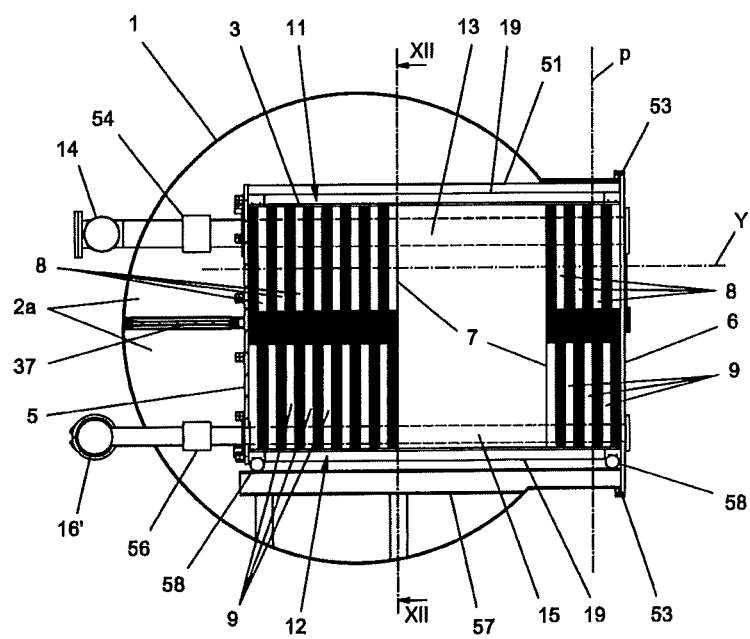
FIG. 11 discloses a side view similar to FIG. 4 of a plate heat exchanger in the vessel of the distillation plant according to a third embodiment of the invention.
Figure 12:
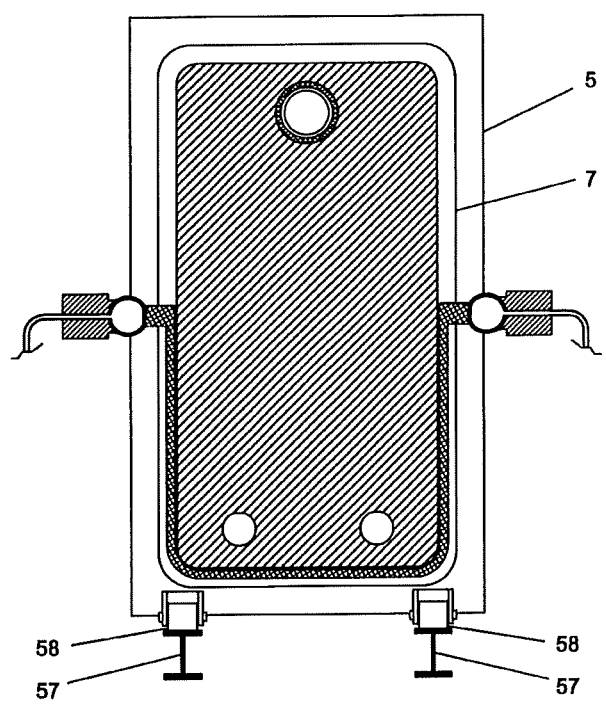
FIG. 12 discloses a plan view of a heat exchanger plate of the plate heat exchanger along the line XII-XII in FIG. 11.

FIGS. 11 and 12 illustrates a third embodiment which differs from the first embodiment in that the guide member comprises two guide rails 57 on which the plate heat exchanger 3, 4 is movably provided. Rollers or wheels 58 may be provided between the guide rails 57 and the plate heat exchanger 3, 4 to facilitate the moving of the plate heat exchanger 3, 4 on the guide rails. 57. The guide rails 57 extend in parallel with the displacement direction y permitting the plate heat exchanger 3, 4 to be moved in the displacement direction y.

In the third embodiment, the liquid inlet port channel 13 and the liquid outlet port channels 15 extend through the first end plate 5. The inlet connection member 54 and the outlet connection member 56 are located in the inner space 2 inside the vessel 1 as can be seen in FIG. 11.

The inlet connection member 54 is configured to permit connection of the liquid inlet port channel 13 and the liquid feed conduit 14 by the movement of the plate heat exchanger 3, 4 along the displacement direction y.

The outlet connection member 56 is configured to permit connection of the two liquid outlet port channels 15 to the condensate discharge conduit 16' by the movement of the plate heat exchanger 3, 4 along the displacement direction y.

Figure 8:
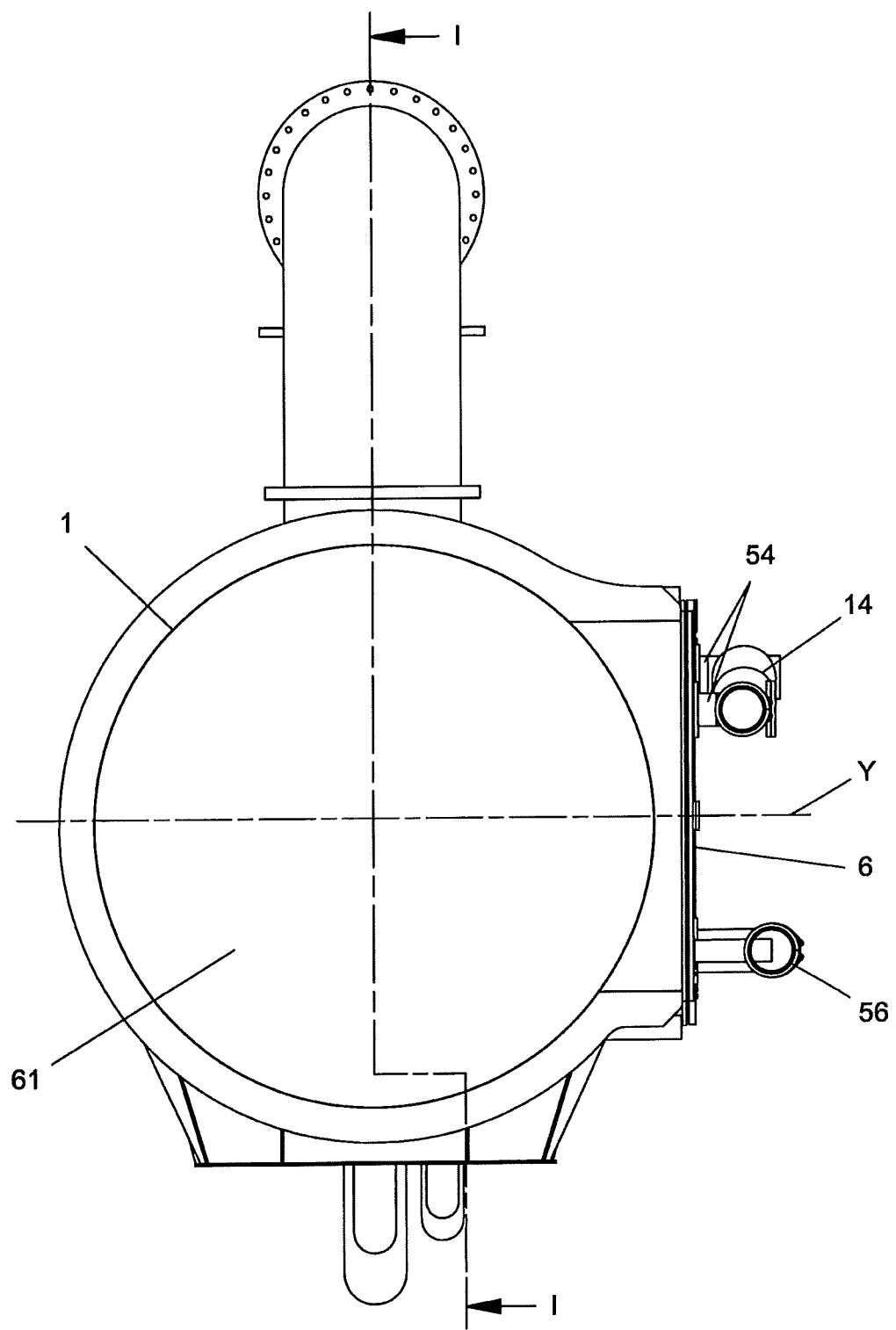
FIG. 8 discloses an end view of the distillation plant in FIG. 7.

The plate heat exchanger 3, 4 of the third embodiment may be located in a vessel 1 shown in FIGS. 7 and 8 or in vessel 1 shown in FIGS. 9 and 10.

Figure 13:
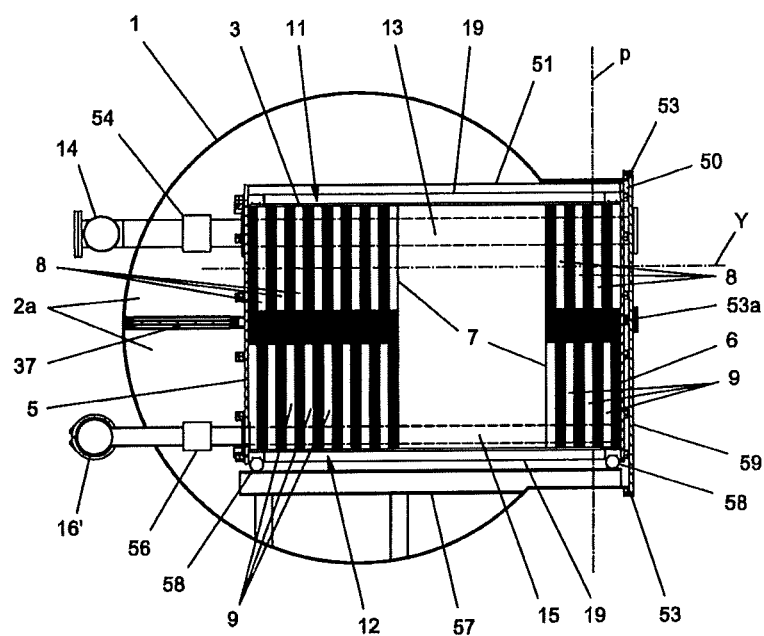
FIG. 13 discloses a side view similar to FIG. 4 of a plate heat exchanger in the vessel of the distillation plant according to a fourth embodiment of the invention.

FIG. 13 discloses a fourth embodiment, which differs from the third embodiment in that, the second end plate 6 of the plate heat exchangers 3, 4 is provided inside the associated opening 50. In this case, also the second end plate 6 is smaller than the rectangular associated opening 50. A separate cover 59, which is bigger than the associated opening 50, is provided outside the second end plate 6 and is sealingly closing the associated opening 50 through the vessel 1. A gasket 53 is provided between the vessel 1 and the separate cover 59. A dividing gasket 53a is provided between the second end plate 6 and the separate cover 59, possibly as a part of the sealing arrangement, to separate the first part space 2a' from the second part space 2a".

Figure 14:
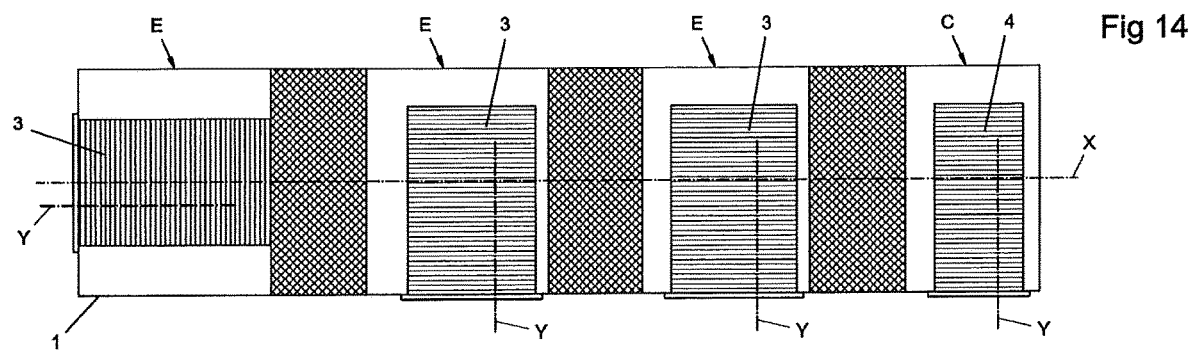
FIG. 14 discloses a schematic longitudinal sectional view from above of a distillation plant according to fifth embodiment of the invention.

FIG. 14 illustrates a fifth embodiment which differs from the previous embodiments in that a first one of the primary plate heat exchangers 3, to the left in FIG. 14, is provided so that the extension plane of the heat exchanger plates 7 is perpendicular to the longitudinal axis x. The first primary plate heat exchanger 3 is removable from the operating position out of the vessel 1 through the associated opening 50 by being moved in a displacement direction y, which is perpendicular to the extension plane p of the heat exchanger plates 7, but parallel with the longitudinal axis x.

The remaining plate heat exchangers 3, 4 are oriented so that the extension plane p of the heat exchanger plates 7 extends in parallel with the longitudinal axis x of the vessel 1.

Figure 15:
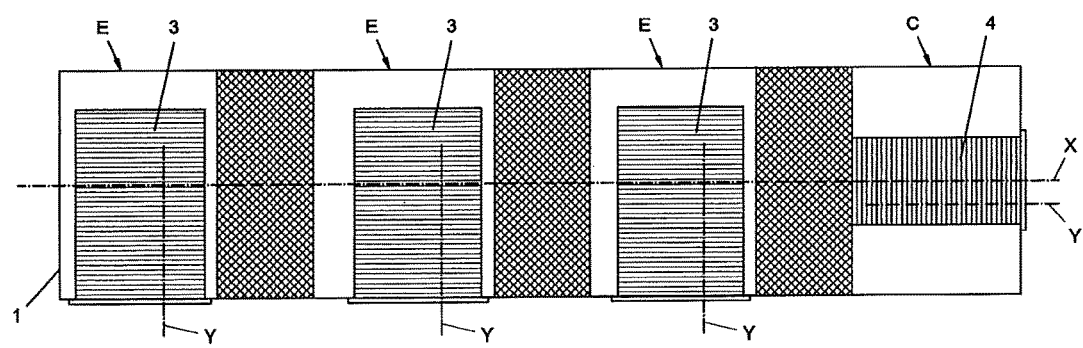
FIG. 15 discloses a schematic longitudinal sectional view from above of a distillation plant according to sixth embodiment of the invention.

FIG. 15 illustrates a sixth embodiment which differs from the previous embodiments in that a last one of the plate heat exchangers, i.e. the condenser 4, to the right in FIG. 15, is provided so that the extension plane of the heat exchanger plates 7 is perpendicular to the longitudinal axis x. The condenser 4 is removable from the operating position out of the vessel 1 through the associated opening 50 by being moved in a displacement direction y, which is perpendicular to the extension plane p of the heat exchanger plates 7, but parallel with the longitudinal axis x.

The remaining primary plate heat exchangers 3 are oriented so that the extension plane p of the heat exchanger plates 7 extends in parallel with the longitudinal axis x of the vessel 1.

In the embodiments disclosed, the distillation plant comprises three effects E. It is to be noted, however, that the distillation plant may comprise another number of effects E, for instance only one effect E, two effects E, four effects E, five effects E or even more, all provided in the vessel 1.

It is also to be noted that several vessels 1 may be provided each comprising a plurality of effects E.

It is to be noted that each effect E may comprise not only two primary plate heat exchangers 3 as disclosed. Each effect E may also comprise only one primary plate heat exchanger 3, three primary plate heat exchangers 3, four primary plate heat exchangers 3, or even more primary plate heat exchangers 3.

When more than one primary plate heat exchanger 3 is provided in each effect E, the primary plate heat exchangers 3 will operate in parallel with each other, or in other words the length of a primary plate heat exchanger 3 may be extended by arranging more than one primary plate heat exchanger 3 in an effect E.

Furthermore, it is to be noted that the condenser effect C may comprise more than one plate heat exchangers, i.e. more than one condensers 4.

It is also possible to provide different numbers of primary plate heat exchangers 3 in the different effects E. For instance, the number of primary plate heat exchangers 3 in each effect E may increase along the longitudinal axis x such that, for example, a first effect E may comprise one primary plate heat exchanger 3, a second effect E two primary plate heat exchangers 3, a third effect E three primary plate heat exchangers 3, a fourth effect E also three primary plate heat exchangers 3, etc.

The present invention is not limited to the embodiments disclosed but may be varied and modified within the scope of the following claims.

The invention claimed is:

1. A distillation plant comprising
    an elongated vessel extending along a longitudinal axis and defining an inner space, and a plurality of plate heat exchangers, which in an operating position are arranged after each other along the longitudinal axis of the vessel,
    wherein each plate heat exchanger comprises a first end plate, a second end plate and a plurality of heat exchanger plates, each of said heat exchanger plates defining an extension plane,
    wherein the heat exchanger plates are arranged between the first end plate and the second end plate to form first plate interspaces and second plate interspaces, the first and second plate interspaces being arranged in an alternating order in the plate heat exchanger, and
    wherein the first end plate and the heat exchanger plates of the plate heat exchangers are in the operating position provided in the inner space,
    a plurality of the plate heat exchangers are each associated with a respective opening through the vessel, and
    each of the plurality of plate heat exchangers is removable from the operating position out of the vessel through the associated opening by being moved in a displacement direction, which is perpendicular to the extension plane of the heat exchanger plates.

2. The distillation plant according to claim 1, wherein the at least one of the plate heat exchangers is supported by a guide member, which permits the plate heat exchanger to be moved in the displacement direction.

3. The distillation plant according to claim 2, wherein the guide member comprises a suspension rail in which the plate heat exchanger is movably suspended.

4. The distillation plant according to claim 2, wherein the guide member comprises two guide rails on which the plate heat exchanger is movably provided.

5. The distillation plant according to claim 2, wherein the second end plate of the at least one of the plate heat exchangers forms a cover sealingly closing the associated opening through the vessel.

6. The distillation plant according to claim 1, wherein the plurality of plate heat exchangers comprises at least one primary plate heat exchanger in which the first plate interspaces are configured for condensation and the second plate interspaces are configured for evaporation, and wherein the at least one primary plate heat exchanger has a steam inlet, which extends perpendicularly to the extension plane of the heat exchanger plates and communicates with the first plate interspaces, and
- a steam outlet, which extends perpendicularly to the extension plane of the heat exchanger plates and communicates with the second plate interspaces.

7. The distillation plant according to claim 6, comprising a sealing arrangement separating the steam inlet from the steam outlet of the at least one primary plate heat exchanger in the operating position in the inner space.

8. The distillation plant according to claim 7, wherein the at least one primary plate heat exchanger comprises a first transition area extending perpendicularly to the extension plane of the heat exchanger plates between the steam inlet and the steam outlet, and a second transition area extending perpendicularly to the extension plane of the heat exchanger plates between the steam inlet and the steam outlet, and wherein the sealing arrangement comprises a first sealing member engaging the first transition area and a second sealing member engaging the second transition area.

9. The distillation plant according to claim 8, wherein each of the first and second sealing members is inflatable from a rest position at a distance from the first transition area and the second transition area, respectively, to a sealing position at which each of the first and second sealing members engages the first transition area and the second transition area, respectively.

10. The distillation plant according to claim 8, wherein the at least one primary plate heat exchanger comprises a respective gasket in each of the first plate interspaces and the second plate interspaces, and wherein each gasket extends to the first transition area and to the second transition area.

11. The distillation plant according to claim 6, wherein the at least one primary plate heat exchanger has a liquid inlet port channel communicating with the second plate interspaces and connected to a liquid feed conduit for the supply of a liquid to be evaporated in the second plate interspaces, and a liquid outlet port channel communicating with the first plate interspaces and connected to a condensate discharge conduit for the discharge of a condensate from the first plate interspaces.

12. The distillation plant according to claim 11, wherein the liquid inlet port channel and the liquid outlet port channel extend through the second end plate.

13. The distillation plant according to claim 11, wherein the liquid inlet port channel and the liquid outlet port channel both extend through the first end plate.

14. The distillation plant according to claim 6, comprising a plurality of effects, each effect comprising at least one primary plate heat exchanger, and wherein each effect comprises a liquid separator provided in the inner space downstream of the second plate interspaces.

15. The distillation plant according to claim 14, wherein the inner space defines a plurality of subspaces, one for each effect, wherein each subspace defines a first part space communicating with the first plate interspaces and a second part space communicating with the second plate interspaces, and wherein a second part space of one effect communicates with a first part space of a subsequent effect.

16. The distillation plant according to claim 1, wherein the extension plane of the heat exchanger plates of at least one of the plurality of plate heat exchangers extends in parallel with the longitudinal axis of the vessel.

17. A distillation plant comprising
an elongated vessel extending along a longitudinal axis and defining an inner space, and a plurality of plate heat exchangers, which in an operating position are arranged after each other along the longitudinal axis of the vessel,
wherein each plate heat exchanger comprises a first end plate, a second end plate and a plurality of heat exchanger plates, each heat exchanger plate defining an extension plane, and tie bolts extending through the first end plate and the second end plate of each plate heat exchanger for tightening the heat exchanger plates against each other,
wherein the heat exchanger plates of each plate heat exchanger are arranged between the first end plate and the second end plate of the respective plate heat exchanger to form first plate interspaces and second plate interspaces, the first and second plate interspaces of each plate heat exchanger being arranged in an alternating order in the plate heat exchanger,
the first end plate and the heat exchanger plates of each respective plate heat exchanger being positioned in the inner space when in the operating position,
a plurality of openings passing through a wall of the vessel,
each of the plurality of plate heat exchangers being associated with a respective one of the openings passing through the wall of the vessel, and
each of the plurality of plate heat exchangers being removable from the operating position out of the vessel through the associated opening by being moved in a displacement direction that is perpendicular to the extension plane of the heat exchanger plates.

18. The distillation plant according to claim 17, wherein each of the plate heat exchangers is supported on a respective rail to allow the plate heat exchangers to be removed from the operating position out of the vessel through the associated opening.

19. A distillation plant comprising
an elongated vessel extending along a longitudinal axis and defining an inner space, and a plurality of plate heat exchangers, which in an operating position are arranged after each other along the longitudinal axis of the vessel,
wherein each plate heat exchanger comprises a plurality of heat exchanger plates positioned between a first end plate and a second end plate, each of the heat exchanger plates defining an extension plane, the extension plane of the plurality of heat exchanger plates being parallel to the longitudinal axis of the vessel,
wherein the heat exchanger plates of each plate heat exchanger are arranged between the first end plate and the second end plate of the respective plate heat exchanger to form first plate interspaces and second plate interspaces, the first and second plate interspaces of each plate heat exchanger being arranged in an alternating order in the plate heat exchanger,
the first end plate and the heat exchanger plates of each respective plate heat exchanger being positioned in the inner space when in the operating position,
a plurality of openings passing through a wall of the vessel,
each of the plurality of plate heat exchangers being associated with a respective one of the openings passing through the wall of the vessel, and each of the plurality of plate heat exchangers being removable from the operating position out of the vessel through the associated opening by being moved in a displacement direction that is perpendicular to the extension plane of the heat exchanger plates.

20. The distillation plant according to claim 19, wherein each of the openings passing through the wall of the vessel is rectangular in shape.

\* \* \* \* \*